(12) United States Patent  
Pschierer

(10) Patent No.: US 8,725,320 B1  
(45) Date of Patent: *May 13, 2014

(54) GRAPHICAL DEPICTION OF FOUR DIMENSIONAL TRAJECTORY BASED OPERATION FLIGHT PLANS

(75) Inventor: Karl Christian Pschierer, Ochsenfurt (DE)

(73) Assignee: The Boeing Company, Chicago, IL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/540,385

(22) Filed: Jul. 2, 2012

Related U.S. Application Data

(62) Division of application No. 12/781,548, filed on May 17, 2010, now Pat. No. 8,396,614.

(51) Int. Cl.  
*G05D 1/00* (2006.01)

(52) U.S. Cl.  
USPC ............ 701/5; 701/30; 701/34; 701/465; 701/468

(58) Field of Classification Search  
USPC ............ 701/5, 30, 34, 40, 465, 467, 468  
See application file for complete search history.

(56) References Cited

U.S. PATENT DOCUMENTS

| | | | |
|---|---|---|---|
| 4,774,670 A | 9/1988 | Palmieri | |
| 5,051,910 A | 9/1991 | Liden | |
| 6,049,754 A | 4/2000 | Beaton et al. | |
| 6,442,526 B1 * | 8/2002 | Vance et al. | 705/5 |
| 6,658,349 B2 | 12/2003 | Cline | |
| 6,970,784 B2 | 11/2005 | Shinagawa | |
| 7,162,335 B2 | 1/2007 | He et al. | |
| 7,577,501 B2 * | 8/2009 | Tafs et al. | 701/14 |
| 7,623,960 B2 * | 11/2009 | Wise et al. | 701/465 |
| 7,756,632 B2 | 7/2010 | Wise et al. | |
| 7,792,615 B2 * | 9/2010 | Aimar | 701/11 |
| 8,209,115 B2 | 6/2012 | Lucas et al. | |
| 8,244,466 B2 | 8/2012 | DeJonge et al. | |
| 8,396,614 B1 * | 3/2013 | Pschierer | 701/3 |

OTHER PUBLICATIONS

Notice of allowance dated Nov. 15, 2012 regarding U.S. Appl. No. 12/781,548, 16 pages.  
"Aeronautical Information Services-Aeronautical Information Management Study Group (AIS-AIMSG)", AIS-AIMSG/2-SN, No. 13, Nov. 2009, 3 pages.  
"Flight and Flow Information for a Collaborative Environment—A Concept", Draft Version A.4, prepared by Air Traffic Management Requirements and Performance Panel, Mar. 2010, 138 pages.  
"Business Trajectory / '4D' Trajectory", SESAR Joint Undertaking, No. 2, Feb. 2010, 3 pages http://www.sesarju.eu/sites/default/files/documents/reports/SESAR_Factsheet_4DTrajectory_2_.pdf?issuusl=ignore.  
Jackson, "CDA with RTA in a Mixed Environment", 28th Digital Avionics Systems Conference, Oct. 2009, 10 pages.

(Continued)

*Primary Examiner* — Toan To  
(74) *Attorney, Agent, or Firm* — Yee & Associates, P.C.

(57) ABSTRACT

The different advantageous embodiments provide a system comprising a user interface and a computer. The user interface comprises a display. The computer is configured to display information about time and position of an aircraft in relation to a number of waypoints for a flight on the display. The information is displayed using a number of graphical display features.

8 Claims, 8 Drawing Sheets

(56) References Cited

OTHER PUBLICATIONS

Klooster et al., "Controlled Time-of-Arrival Flight Trials: Results and Analysis", 8th USA/Europe Air Traffic Management Research and Development Seminar (ATM 2009), Jun.-Jul. 2009, 11 pages.

Manzi, "Wide Scale CTA Flight Trials at Stockholm Arlanda Airport", 28th Digital Avionics Systems Conference, Oct. 2009, 13 pages.

Stibor et al., "Implementation of Continuous Descent Approaches at Stockholm Arlanda Airport, Sweden", 28th Digital Avionics Systems Conference, Oct. 2009, 13 pages.

USPTO Office Action dated Feb. 27, 2012 regarding U.S. Appl. No. 12/781,525, 13 pages.

USPTO Final Office Action dated Jul. 12, 2012 regarding U.S. Appl. No. 12/781,525, 13 pages.

Clark et al., "Four Dimensional Trajectory Based Operation Flight Plans", patent U.S. Appl. No. 12/781,525, filed May 17, 2010, 42 pages.

Pschierer, "Graphical Depiction of Four Dimensional Trajectory Based Operation Flight Plans", U.S. Appl. No. 12/781,548, filed May 17, 2010, 49 pages.

* cited by examiner

GRAPHICAL DEPICTION OF FOUR DIMENSIONAL TRAJECTORY BASED OPERATION FLIGHT PLANS

CROSS REFERENCE TO RELATED APPLICATIONS

This application is a divisional application of U.S. application Ser. No. 12/781,548, entitled "GRAPHICAL DEPICTION OF FOUR DIMENSIONAL TRAJECTORY BASED OPERATION FLIGHT PLANS," filed May 17, 2010, status, Pending.

This application is related to commonly assigned and co-pending U.S. patent application Ser. No. 12/781,525 entitled "Four Dimensional Trajectory Based Operation Flight Plans," which is hereby incorporated by reference.

BACKGROUND INFORMATION

1. Field

The present disclosure relates generally to aircraft and, in particular, to a method and system for depicting flight plan information. Still more particularly, the present disclosure provides a method and system for graphically depicting important information about current flight plan status during flight.

2. Background

Aircraft flight management systems rely on flight plans for route and destination information. These flight plans are pre-defined and preloaded before a flight into the flight management system. The flight management system is often implemented in a flight deck computer of the aircraft or an electronic flight bag. A flight plan will include a required time of arrival for the aircraft at waypoints along the route and the destination.

During flight, an aircraft may encounter a number of conditions that affect the travel time of the aircraft. For example, wind conditions may affect the speed of an aircraft. When a condition affects the travel time of the aircraft, a required time of arrival at a particular waypoint or destination may no longer be met by the aircraft. This results in air traffic delays that are often not realized until the aircraft has reached its destination.

Current flight plans primarily rely on defined airways and navigation waypoints, but air traffic management is moving towards a "free flight" mode that is not limited to fixed airways. To ensure sufficient separation between aircraft in this environment flight plans will become four dimensional (4D) paths. Timing along the route is not as important as arrival time at a destination waypoint with traditional flight paths, but a 4D flight plan requires accurate timing all along the flight path to maintain airspace separation. Current systems are not designed to readily provide situational awareness of actual flight path as compared to a 4D flight plan. It is also important to update 4D flight plans during flight and quickly provide updated situational information to pilots.

Therefore, it would be advantageous to have a method and apparatus that addresses one or more of the issues discussed above.

SUMMARY

The different advantageous embodiments provide a system comprising a user interface and a computer. The user interface comprises a display. The computer is configured to display information about time and position of an aircraft in relation to a number of waypoints for a flight on the display. The information is displayed using a number of graphical display features.

The different advantageous embodiments further provide a method for graphical depiction of flight information. First flight information associated with a flight plan is received by a computer. The first flight information has a number of waypoints and a number of required times of arrival for the number of waypoints. A number of graphical display features is generated by the computer using the first flight information. The number of graphical display features is integrated by the computer with navigation information presented on a display. Updated flight information is continually received during a flight. The updated flight information has a number of estimated times of arrival for the number of waypoints. A determination is made by the computer as to whether the number of estimated times of arrival deviates from the number of required times of arrival. In response to a determination that the number of estimated times of arrival deviates from the number of required times of arrival, the number of graphical display features is updated by the computer using the updated flight information.

The different advantageous embodiments further provide a computer program product for depicting graphical flight information comprising a computer recordable storage medium and program code stored on the computer recordable storage medium. The program code receives first flight information associated with a flight plan having a number of waypoints and a number of required times of arrival for the number of waypoints, generates a number of graphical display features using the first flight information, integrates the number of graphical display features with navigation information presented on a display, continually receives updated flight information during a flight having a number of estimated times of arrival for the number of waypoints, determines whether the number of estimated times of arrival deviates from the number of required times of arrival, and responsive to a determination that the number of estimated times of arrival deviates from the number of required times of arrival, updates the number of graphical display features using the updated flight information.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
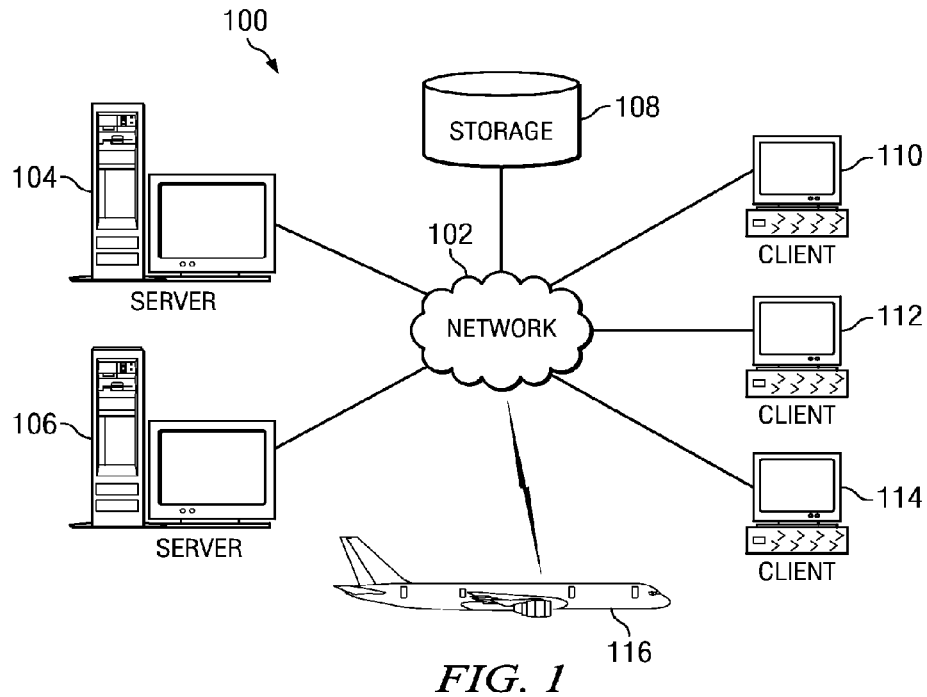
FIG. 1 is an illustration of a network of data processing systems in which an advantageous embodiment may be implemented.
Figure 2:
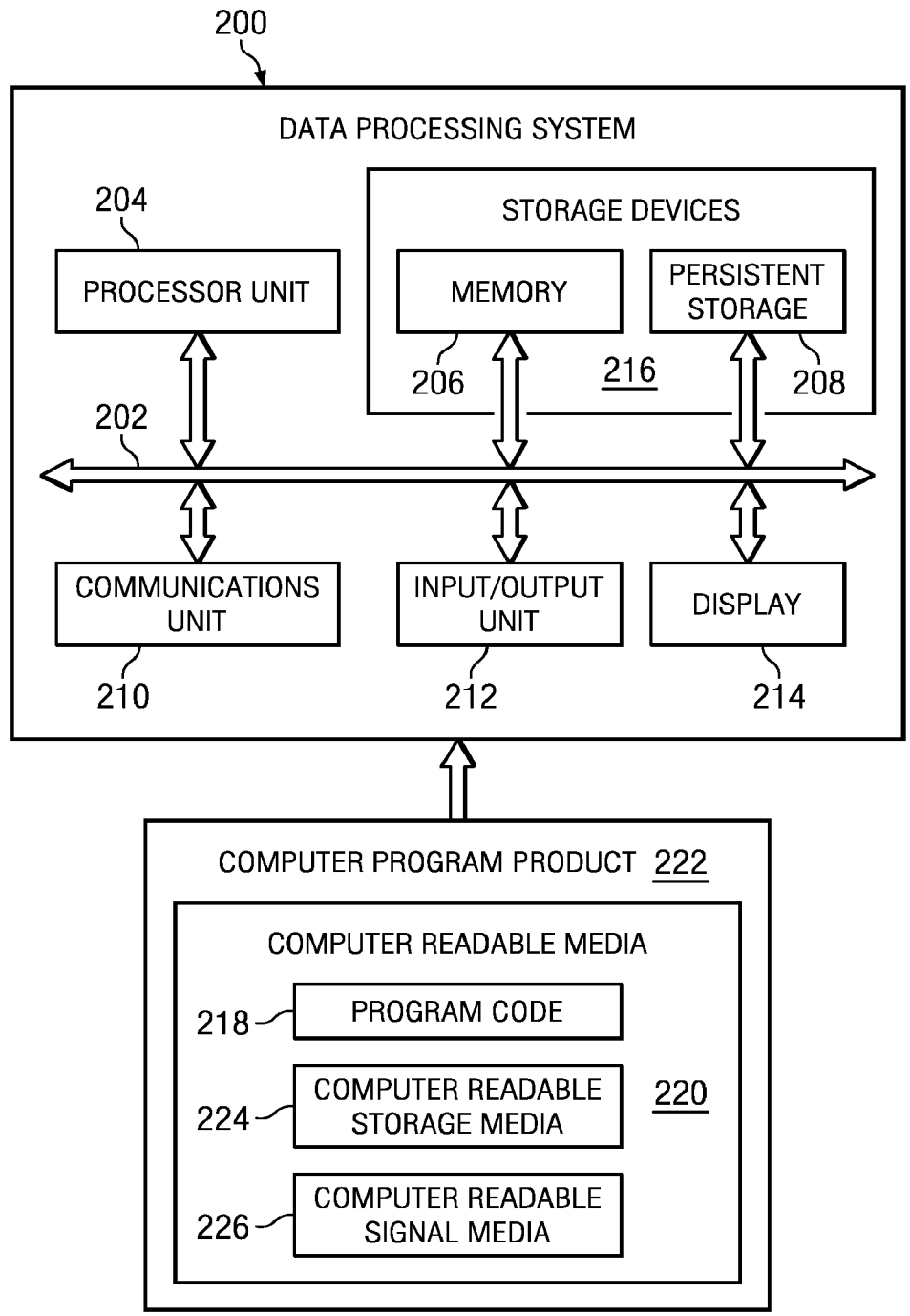
FIG. 2 is an illustration of a data processing system in accordance with an advantageous embodiment.

With reference now to the figures and in particular with reference to FIGS. 1-2, exemplary diagrams of data processing environments are provided in which the advantageous embodiments of the present invention may be implemented. It should be appreciated that FIGS. 1-2 are only exemplary and are not intended to assert or imply any limitation with regard to the environments in which different embodiments may be implemented. Many modifications to the depicted environments may be made.

With reference now to the figures, FIG. 1 depicts a pictorial representation of a network of data processing systems in which the advantageous embodiments of the present invention may be implemented. Network data processing system 100 is a network of computers in which embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Aircraft 116 also is a client that may exchange information with clients 110, 112, and 114. Aircraft 116 also may exchange information with servers 104 and 106. Aircraft 116 may exchange data with different computers through a wireless communications link while in-flight or through any other type of communications link while on the ground. In these examples, server 104, server 106, client 110, client 112, and client 114 may be computers. Network data processing system 100 may include additional servers, clients, and other devices not shown.

In the depicted example, network data processing system 100 is the Internet with network 102 representing a worldwide collection of networks and gateways that use the Transmission Control Protocol/Internet Protocol (TCP/IP) suite of protocols to communicate with one another. Of course, network data processing system 100 also may be implemented as a number of different types of networks, such as for example, an intranet, a local area network (LAN), or a wide area network (WAN). FIG. 1 is intended as an example, and not as an architectural limitation for different embodiments.

Turning now to FIG. 2, a block diagram of a data processing system is depicted in accordance with an advantageous embodiment. Data processing system 200 is an example of a data processing system that may be used to implement servers and clients, such as server 104 and client 110. Further, data processing system 200 is an example of a data processing system that may be found in aircraft 116 in FIG. 1.

In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a number of processors, a multi-processor core, or some other type of processor, depending on the particular implementation. A number, as used herein with reference to an item, means one or more items. Further, processor unit 204 may be implemented using a number of heterogeneous processor systems in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example without limitation, data, program code in functional form, and/or other suitable information either on a temporary basis and/or a permanent basis. Memory 206, in these examples, may be, for example, a random access memory or any other suitable volatile or non-volatile storage device. Persistent storage 208 may take various forms depending on the particular implementation.

For example, persistent storage 208 may contain one or more components or devices. For example, persistent storage 208 may be a hard drive, a flash memory, a rewritable optical disk, a rewritable magnetic tape, or some combination of the above. The media used by persistent storage 208 also may be removable. For example, a removable hard drive may be used for persistent storage 208.

Communications unit 210, in these examples, provides for communications with other data processing systems or devices. In these examples, communications unit 210 is a network interface card. Communications unit 210 may provide communications through the use of either or both physical and wireless communications links.

Input/output unit 212 allows for input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications and/or programs may be located in storage devices 216, which are in communication with processor unit 204 through communications fabric 202. In these illustrative examples the instruction are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code in the different embodiments may be embodied on different physical or tangible computer readable media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222 in these examples. In one example, computer readable media 220 may be computer readable storage media 224 or computer readable signal media 226. Computer readable storage media 224 may include, for example, an optical or magnetic disk that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory, that is connected to data processing system 200. In some instances, computer readable storage media 224 may not be removable from data processing system 200. In these illustrative examples, computer readable storage media 224 is a non-transitory computer readable storage medium.

Alternatively, program code 218 may be transferred to data processing system 200 using computer readable signal media 226. Computer readable signal media 226 may be, for example, a propagated data signal containing program code 218. For example, computer readable signal media 226 may be an electromagnetic signal, an optical signal, and/or any other suitable type of signal. These signals may be transmitted over communications links, such as wireless communications links, optical fiber cable, coaxial cable, a wire, and/or any other suitable type of communications link. In other words, the communications link and/or the connection may be physical or wireless in the illustrative examples.

In some advantageous embodiments, program code 218 may be downloaded over a network to persistent storage 208 from another device or data processing system through computer readable signal media 226 for use within data processing system 200. For instance, program code stored in a computer readable storage medium in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different advantageous embodiments may be implemented in a data processing system including components in addition to or in place of those illustrated for data processing system 200. Other components shown in FIG. 2 can be varied from the illustrative examples shown. The different embodiments may be implemented using any hardware device or system capable of running program code. As one example, the data processing system may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206, or a cache such as found in an interface and memory controller hub that may be present in communications fabric 202.

As used herein, the phrase "at least one of", when used with a list of items, means that different combinations of one or more of the items may be used and only one of each item in the list may be needed. For example, "at least one of item A, item B, and item C" may include, for example, without limitation, item A or item A and item B. This example also may include item A, item B, and item C or item B and item C.

As used herein, when a first component is connected to a second component, the first component may be connected to the second component without any additional components. The first component also may be connected to the second component by one or more other components. For example, one electronic device may be connected to another electronic device without any additional electronic devices between the first electronic device and the second electronic device. In some cases, another electronic device may be present between the two electronic devices connected to each other.

The different advantageous embodiments recognize and take into account that current flight management systems display en-route and terminal charts associated with a flight plan using static information, or information that was predefined and preloaded well before the flight. When conditions during flight affect the travel time of the aircraft, the information depicting route information may become less relevant. The trajectory information provided in a navigational display may contain copious amounts of textual information that is too cumbersome to provide situational awareness in a glance.

Thus, the different advantageous embodiments provide a system comprising a user interface, a computer, and program code. The user interface comprises a display. The computer is configured to execute the program code to depict flight information in a graphical format using a number of graphical display features.

The different advantageous embodiments further provide a method for graphical depiction of flight information. First flight information associated with a flight plan is received by a computer. The first flight information has a number of waypoints and a number of required times of arrival for the number of waypoints. A number of graphical display features is generated by the computer using the first flight information. The number of graphical display features is integrated by the computer with a display. Updated flight information is continually received during a flight. The updated flight information has a number of estimated times of arrival for the number of waypoints. A determination is made by the computer as to whether the number of estimated times of arrival deviates from the number of required times of arrival. In response to a determination that the number of estimated times of arrival deviates from the number of required times of arrival, the number of graphical display features is updated by the computer using the updated flight information.

The different advantageous embodiments further provide a computer program product for depicting graphical flight information comprising a computer recordable storage medium and program code stored on the computer recordable storage medium. The program code receives first flight information associated with a flight plan having a number of waypoints and a number of required times of arrival for the number of waypoints, generates a number of graphical display features using the first flight information, integrates the number of graphical display features with a display, continually receives updated flight information during a flight having a number of estimated times of arrival for the number of waypoints, determines whether the number of estimated times of arrival deviates from the number of required times of arrival, and responsive to a determination that the number of estimated times of arrival deviates from the number of required times or arrival, updates the number of graphical display features using the updated flight information.

Figure 3:
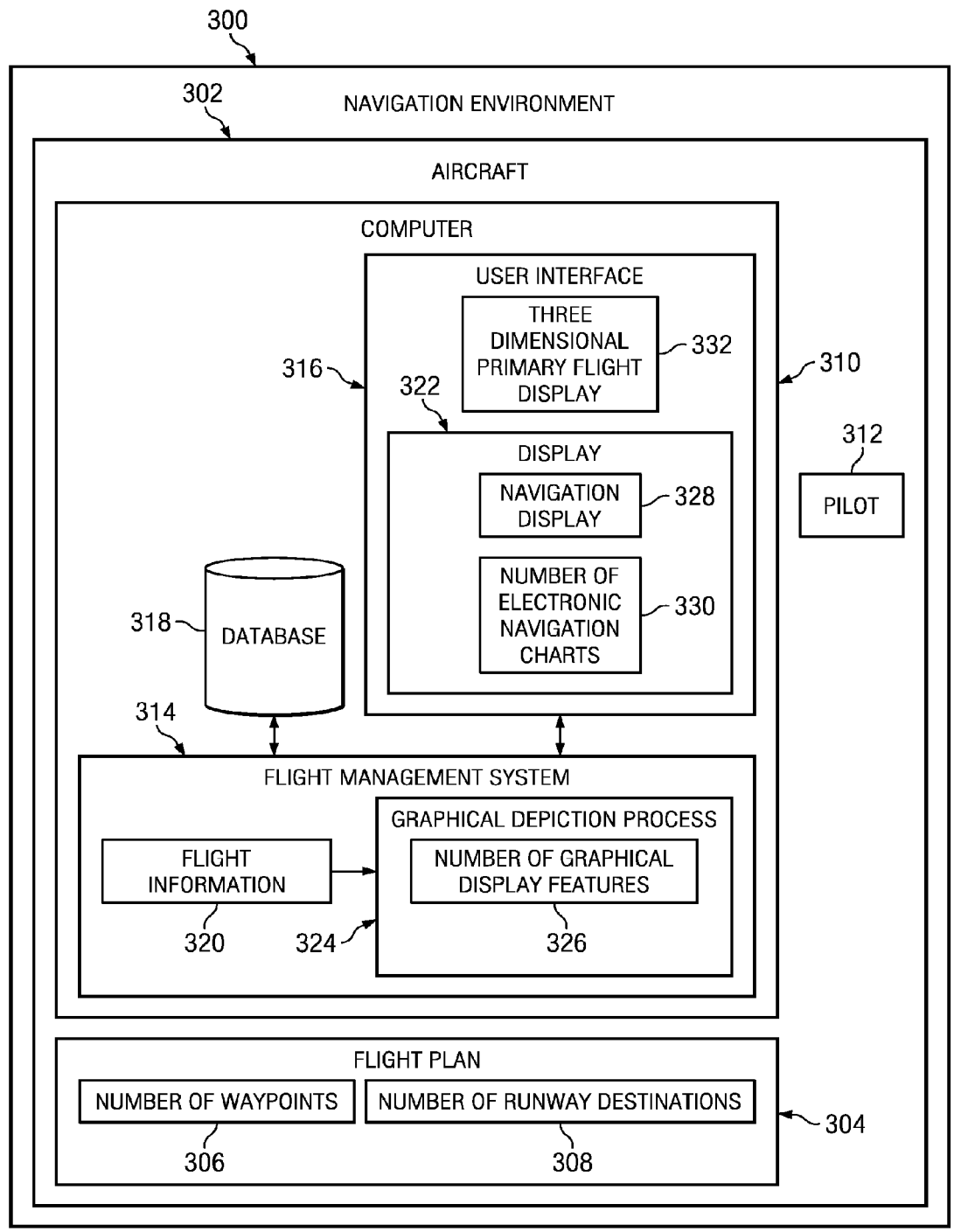
FIG. 3 is an illustration of a navigation environment in accordance with an advantageous embodiment.

With reference now to FIG. 3, an illustration of a navigation environment is depicted in accordance with an advantageous embodiment. Navigation environment 300 may be implemented in a network environment, such as network data processing system 100 in FIG. 1, for example.

Navigation environment 300 may be any type of environment suitable for receiving, viewing, displaying, and/or selecting flight plans for aircraft, for example. Navigation environment 300 includes aircraft 302. Aircraft 302 is an illustrative example of one implementation of aircraft 116 in FIG. 1. Aircraft 302 may be associated with flight plan 304. Flight plan 304 includes number of waypoints 306 and number of runway destinations 308. Number of waypoints 306 is one or more reference points in physical space used for navigation. For example, a waypoint may be a set of coordinates including latitude, longitude, altitude, and/or time that identify a point in physical space. Number of runway destinations 308 is one or more geographical locations associated with a runway, such as an airport runway, for example.

Aircraft 302 includes, without limitation, computer 310 and pilot 312. Computer 310 may be an aircraft data processing system of the aircraft flight deck, an electronic flight bag, and/or any other suitable aircraft computer. Computer 310 includes flight management system 314, user interface 316, and database 318. Flight management system 314 is a system that automates a number of in-flight tasks, such as navigation and flight plan management. Flight management system 314 receives flight information 320 and associated information for a flight. Associated information may include information such as, without limitation, weather information, wind information, electronic en-route charts, terminal charts, and/or any other suitable information, for example. Flight management system 314 uses the flight information and associated information to provide navigational information and navigational aid to pilot 312 over display 322 of user interface 316.

In these illustrative examples, flight management system 314 includes graphical depiction process 324. Flight information 320 is information about the context of a flight, in these illustrative examples. Information about the context of a flight may include, for example, without limitation, information about a flight plan, current aircraft position, current aircraft altitude, current time, and current weather conditions in an environment around aircraft 302, and/or any other suitable information about the context of a flight. Information about a flight plan may include, for example, without limitation, route information, a number of waypoints, required time of arrival for each of the number of waypoints and a number of destinations, estimated time of arrival for each of the number of waypoints and the number of destinations, forecasted weather for the flight route, and/or any other suitable flight plan information.

Graphical depiction process 324 receives flight information 320 about the context of a flight for aircraft 302 and uses flight information 320 to generate number of graphical display features 326. Number of graphical display features 326 depicts information about the context of the flight for aircraft 302 using a number of symbols and/or colors. Graphical depiction process 324 integrates number of graphical display features 326 with display 322. Display 322 may be any illustrative example of display 214 in FIG. 2. Display 322 may present any type of information to pilot 312, such as, for example, without limitation, navigation display 328 and number of electronic navigation charts 330. Navigation display 328 may be, for example, information used during a flight to navigate between a number of waypoints in a flight plan. Number of electronic navigation charts 330 may be another example of types of information used during navigation of a flight and/or during approach and landing at an airport, for example. Three dimensional primary flight display 332 may be an illustrative example of one implementation of display 322.

Pilot 312 may be a human aircraft operator, for example. Pilot 312 views display 322 having number of graphical display features 326 during flight of aircraft 302 to obtain situational awareness of flight status and identify flight context information, such as whether or not a flight is running on time, is running behind schedule, or is running ahead of schedule, for example.

In an illustrative example, number of graphical display features 326 may indicate that aircraft 302 will reach a waypoint ahead of schedule. Pilot 312 may view the graphical feature depicting the waypoint that will be reached ahead of schedule on display 322, and may use the visual information to make a determination about updating or changing a flight plan, for example. In another illustrative example, pilot 312 may view the graphical feature depicting the waypoint that will be reached ahead of schedule on display 322, and select the graphical feature using user interface 316 to retrieve more detailed textual information about the waypoint, the flight plan, the exact amount of time variance between the required time of arrival and the estimated time of arrival for the waypoint, and/or any other suitable information.

The illustration of navigation environment 300 in FIG. 3 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 4:
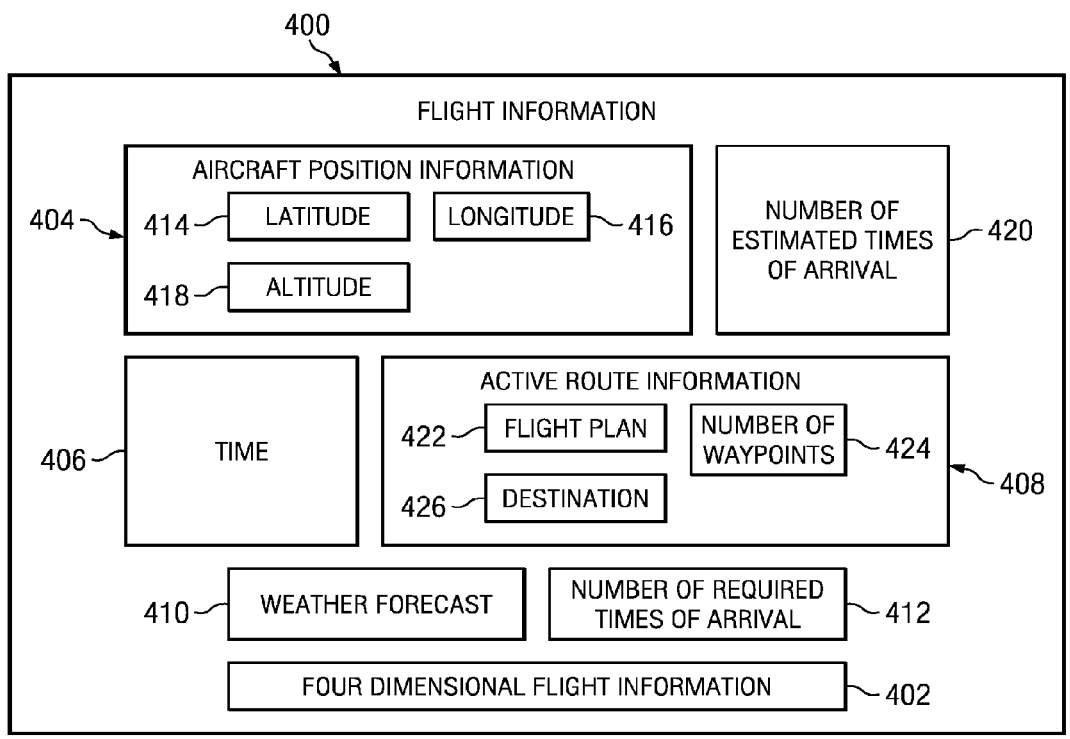
FIG. 4 is an illustration of flight information in accordance with an advantageous embodiment.

With reference now to FIG. 4, an illustration of flight information that may be graphically depicted in accordance with an advantageous embodiment. Flight information 400 is an illustrative example of flight information 320 in FIG. 3.

Flight information 400 is information about the current status of a flight that includes latitude, longitude, altitude, and time information, along with other information in comparison with a four dimensional flight plan. Four dimensional (4D) information includes latitude, longitude, altitude, and time. In an advantageous embodiment, 4D information may consist of latitude, longitude, altitude, and time for waypoints along the route of a flight, for example. Flight information 400 includes information collected and/or calculated about a flight and a flight plan having a number of waypoints or destinations.

Four dimensional flight information 402 may provide real-time or near real-time feedback to an aircraft operator about the position and timing of the aircraft compared to the flight plan and required times of arrival, for example. Information retrieved during flight may be used to build flight context sensitive four dimensional information about aircraft position and timing, and compares that four dimensional information to expected or required position and timing information provided by a flight plan to form four dimensional flight information 402, for example. In an advantageous embodiment, flight information may be continually retrieved and recalculated to update four dimensional flight information 402 during flight to provide up-to-date contextual information for the flight, for example.

Flight information 400 may include aircraft position information 404, time 406, active route information 408, weather forecast 410, number of required times of arrival 412, and number of estimated times of arrival 420. Aircraft position information 404 may include, without limitation, latitude 414, longitude 416, and altitude 418. Latitude 414 and longitude 416 may be determined by a global positioning system of an aircraft, such as aircraft 302 in FIG. 3, for example. Altitude 418 may be determined by a pressure altimeter of an aircraft, such as aircraft 302 in FIG. 3, for example.

Time 406 may be determined by a clock associated with an aircraft computer, such as computer 310 in FIG. 3. Active route information 408 may be stored in a database, such as database 318 in FIG. 3 and/or received from ground services in communication with aircraft 302 in FIG. 3 over a network, such as network 102 in FIG. 1. Active route information may include, without limitation, flight plan 422, number of waypoints 424 associated with flight plan 422, destination 426 associated with flight plan 422, and/or any other suitable information about an active route for an aircraft associated with flight information 400.

Weather forecast 410 may include projected weather information associated with number of waypoints 424, for example. Number of required times of arrival 412 and number of estimated times of arrival 420 are associated with number of waypoints 424. For example, each waypoint in number of waypoints 424 may have an associated required time of arrival from number of required times of arrival 412 and an associated estimated time of arrival from number of estimated times of arrival 420.

Number of estimated times of arrival 420 may be calculated by a flight planning process using aircraft position information 404, time 406, active route information 408, and weather forecast 410, in an illustrative example. Number of estimated times of arrival 420 may be calculated for each waypoint in number of waypoints 424 and/or for destination 426 associated with flight plan 422, for example.

Flight information 400 may be received by graphical depiction process 324 in FIG. 3 and used to generate number of graphical display features 326 for graphical display to a pilot, such as pilot 312 in FIG. 3. Graphical display of flight information 400 enhances situational awareness in a context sensitive manner specific to a particular aircraft in an easy-to-read visual depiction, for example.

The illustration of flight information 400 in FIG. 4 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 5:
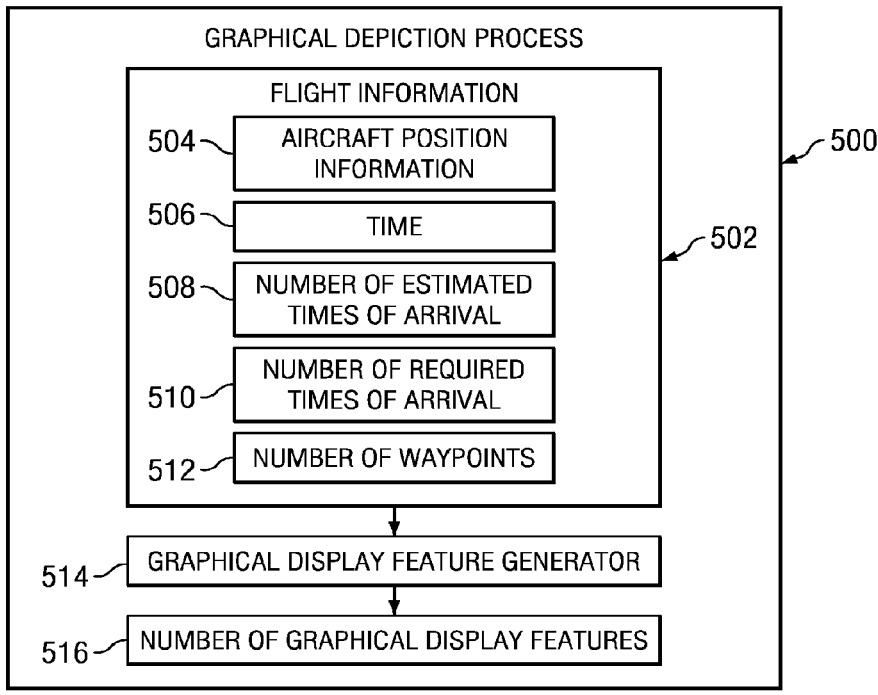
FIG. 5 is an illustration of a graphical depiction process in accordance with an advantageous embodiment.

With reference now to FIG. 5, an illustration of a graphical depiction process is depicted in accordance with an advantageous embodiment. Graphical depiction process 500 is an illustrative example of graphical depiction process 324 in FIG. 3.

Graphical depiction process 500 receives flight information 502 from flight management system, such as flight management system 314 in FIG. 3. Flight information 502 may be an illustrative example of one implementation of flight information 320 in FIG. 3 and/or flight information 400 in FIG. 4.

Flight information 502 may include, for example, without limitation, aircraft position information 504, time 506, number of estimated times of arrival 508, number of required times of arrival 510, and number of waypoints 512. Aircraft position information 504 may be, for example, without limitation, latitude, longitude, and altitude. Number of estimated times of arrival 508 may be associated with number of waypoints 512 and/or a destination for a flight plan associated with flight information 502, for example. Likewise, number of required times of arrival 510 may be associated with number of waypoints 512 and/or a destination for a flight plan associated with flight information 502, for example.

Graphical depiction process 500 includes graphical display feature generator 514. Graphical display feature generator 514 uses flight information 502 to generate number of graphical display features 516. Number of graphical display features 516 is a visual depiction of flight information 502 using symbols and/or colors. Number of graphical display features 516 may depict current flight status information against expected flight plan information in a easy-to-read graphic, providing flight context sensitive feedback to a pilot, such as pilot 312 in FIG. 3.

The illustration of graphical depiction process 500 in FIG. 5 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 6:
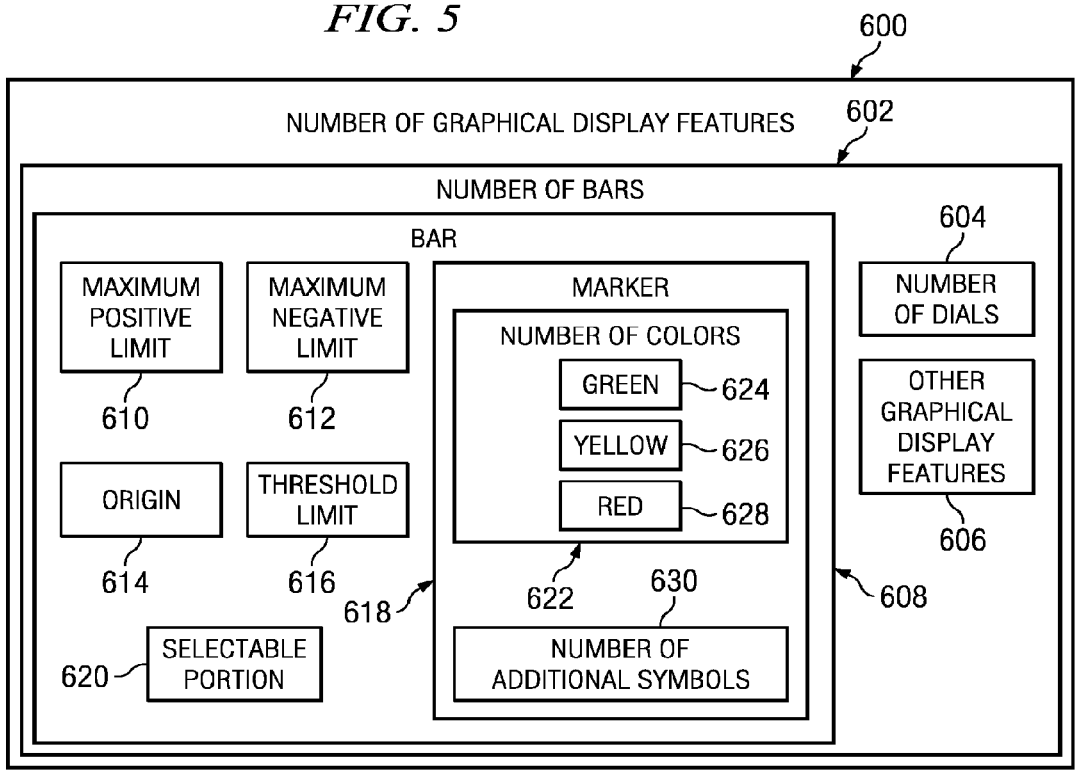
FIG. 6 is an illustration of a number of graphical display features in accordance with an advantageous embodiment.

With reference now to FIG. 6, an illustration of a number of graphical display features is depicted in accordance with an advantageous embodiment. Number of graphical display features 600 is an illustrative example of one implementation of number of graphical display features 326 in FIG. 3 and/or number of graphical display features 516 in FIG. 5.

Number of graphical display features 600 may be graphical symbols implemented as objects and/or pictures rather than textual or alphanumeric information. Number of graphical display features 600 may include, for example, without limitation, number of bars 602, number of dials 604, and other graphical display features 606.

Number of bars 602 may be, in one illustrative example, vertical bars with horizontal lines denoting lower and upper limits, for example. In another illustrative example, number of bars 602 may be horizontal bars with vertical lines denoting lower and upper limits, for example. Bar 608 is an illustrative example of one implementation of number of bars 602.

Bar 608 includes maximum positive limit 610, maximum negative limit 612, origin 614, threshold limit 616, marker 618, and selectable portion 620. Selectable portion 620 may include a hyperlink to additional textual information, for example. Maximum positive limit 610 may be a line or other indicator denoting an upper limit, for example. Maximum negative limit 612 may be a line or other indicator denoting a lower limit, for example. Origin 614 may be a line or other indicator denoting an expected value without deviation.

Threshold limit 616 may be a pre-defined value outside of maximum positive limit 610 and maximum negative limit 612. For example, if maximum positive limit 610 and maximum negative limit 612 are set at a value of 100% deviation from origin 614, threshold limit 616 may be set at a value of 101% and higher.

Marker 618 is a symbol or object associated with bar 608 that indicates a current status in comparison with an expected status using maximum positive limit 610, maximum negative limit 612, origin 614, and threshold limit 616.

In an illustrative example, if origin 614 denotes a value for a required time of arrival at a waypoint, maximum positive limit 610 may be thirty seconds ahead of origin 614 while maximum negative limit 612 may be thirty seconds behind origin 614. Threshold limit 616 is any value over thirty-one seconds in this example. In this illustrative example, if flight information 502 in FIG. 5 indicated that the estimated time of arrival for the associated waypoint was thirty seconds ahead of the required time of arrival, marker 618 would be positioned at maximum positive limit 610 along bar 608. In another illustrative example, if flight information 502 in FIG. 5 indicated that the estimated time of arrival for the associated waypoint was thirty-five seconds ahead of the required time of arrival, marker 618 would be positioned at maximum positive limit 610 along bar 608 with number of additional symbols 630, discussed in more detail below.

Marker 618 may also include number of colors 622. In an advantageous embodiment, number of colors 622 may be used in addition to the position of marker 618 along bar 608 to indicate context of maximum positive limit 610, maximum negative limit 612, and origin 614. In an illustrative example, if marker 618 is positioned at or adjacent to origin 614 along bar 608, marker may be one color. If marker 618 is positioned between origin 614 and maximum positive limit 610, marker may be a second color. If marker 618 is positioned at or adjacent to maximum positive limit 610, marker may be a third color, in this illustrative example. In this example, color may serve as an additional graphical indicator of flight context in addition to the position of marker 618 along bar 608.

Number of colors 622 may include, for example, without limitation, green 624, yellow 626, and red 628. In an illustrative example, green 624 may be associated with a position at or adjacent to origin 614. Yellow 626 may be associated with a position between origin 614 and maximum positive limit 610 and/or between origin 614 and maximum negative limit 612. Red 628 may be associated with a position at or adjacent to maximum positive limit 610 and/or maximum negative limit 612, in this illustrative example.

Marker 618 may also include number of additional symbols 630. Number of additional symbols 630 is a symbol or object that is associated with marker 618 and different from the symbol or object representing marker 618. Number of additional symbols 630 may be used to depict excessive deviations, for example, outside threshold limit 616.

The illustration of number of graphical display features 600 in FIG. 6 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 7:
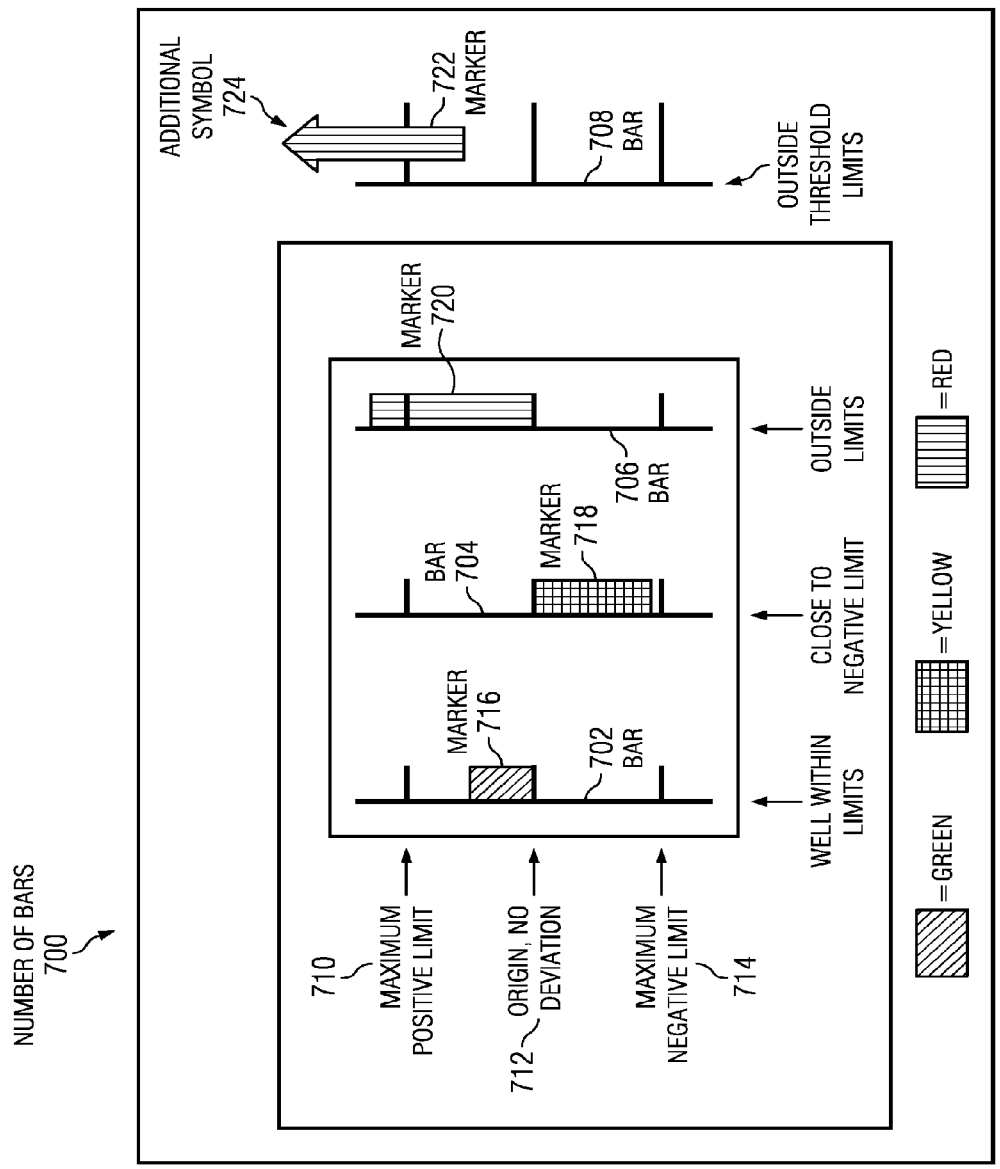
FIG. 7 is an illustration of a number of bars in accordance with an advantageous embodiment.

With reference now to FIG. 7, an illustration of a number of bars is depicted in accordance with an advantageous embodiment. Number of bars 700 may be an illustrative example of one implementation of number of bars 602 in FIG. 6.

Number of bars 700 includes bar 702, bar 704, bar 706, and bar 708. Each of bar 702, bar 704, bar 706, and bar 708 includes maximum positive limit 710, origin 712, and maximum negative limit 714. Origin 712 is a point of no deviation from an expected or required value. For example, origin 712 may be an expected or required position, such as latitude, longitude, or altitude, according to a flight plan. In another example, origin 712 may be an expected or required time associated with a position. Maximum positive limit 710 is a predefined value above or ahead of origin 712. For example, where origin 712 is an expected or required time or arrival at a position, maximum positive limit 710 may be a value ahead of that time indicating arrival earlier than the expected or required time of arrival. Maximum negative limit 714 is a predefined value below or behind origin 712. For example, where origin 712 is an expected or required time or arrival, maximum negative limit 714 may be a value behind that time indicating arrival later than the expected or required time of arrival at a particular waypoint. In these illustrative examples, the predefined values for maximum positive limit 710 and/or maximum negative limit 714 may be a value indicating a maximum allowed tolerance as defined by authorities, regulations, laws, and the like, for example.

In this illustrative example, marker 716 is adjacent to origin 712 on bar 702. As such, in this example, marker 716 is depicted using the color green. The colors selected for association with maximum positive limit 710, origin 712, and maximum negative limit 714 are used for illustrative purposes and do not limit the functionality or architecture of the invention in any way. Any color may be selected to associate with origin 712, for example. Marker 718 is positioned between origin 712 and maximum negative limit 714 on bar 704, in this example, and depicted using the color yellow. Marker 720 is positioned at maximum positive limit 710 on bar 706 and depicted using the color red. Marker 720 may illustrate a depiction of a deviation that is outside limits but within a threshold, for example. In an illustrative example, a limit value may be set for maximum positive limit 710 and maximum negative limit 714, and a threshold value may be set outside each of the limit values. In this illustrative example, a deviation that is outside the limit value but within the threshold value is depicted using the color red, such as marker 720 on bar 706.

Marker 722 is positioned at maximum positive limit 710 on bar 708 and depicted using the color red and additional symbol 724. In an illustrative example, additional symbol 724 may indicate a deviation that is both outside the limit value and outside the threshold value. In this illustrative example, the limit value may be up to 150% deviation from origin 712, and the threshold value may be any value larger than 150%. If the deviation is 149% from origin 712, marker 720 is used to depict a deviation outside predefined limits. If the deviation is 151% from origin 712, marker 722 is used with additional symbol 724 to depict a deviation outside threshold limits.

The illustration of number of bars 700 in FIG. 7 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 8:
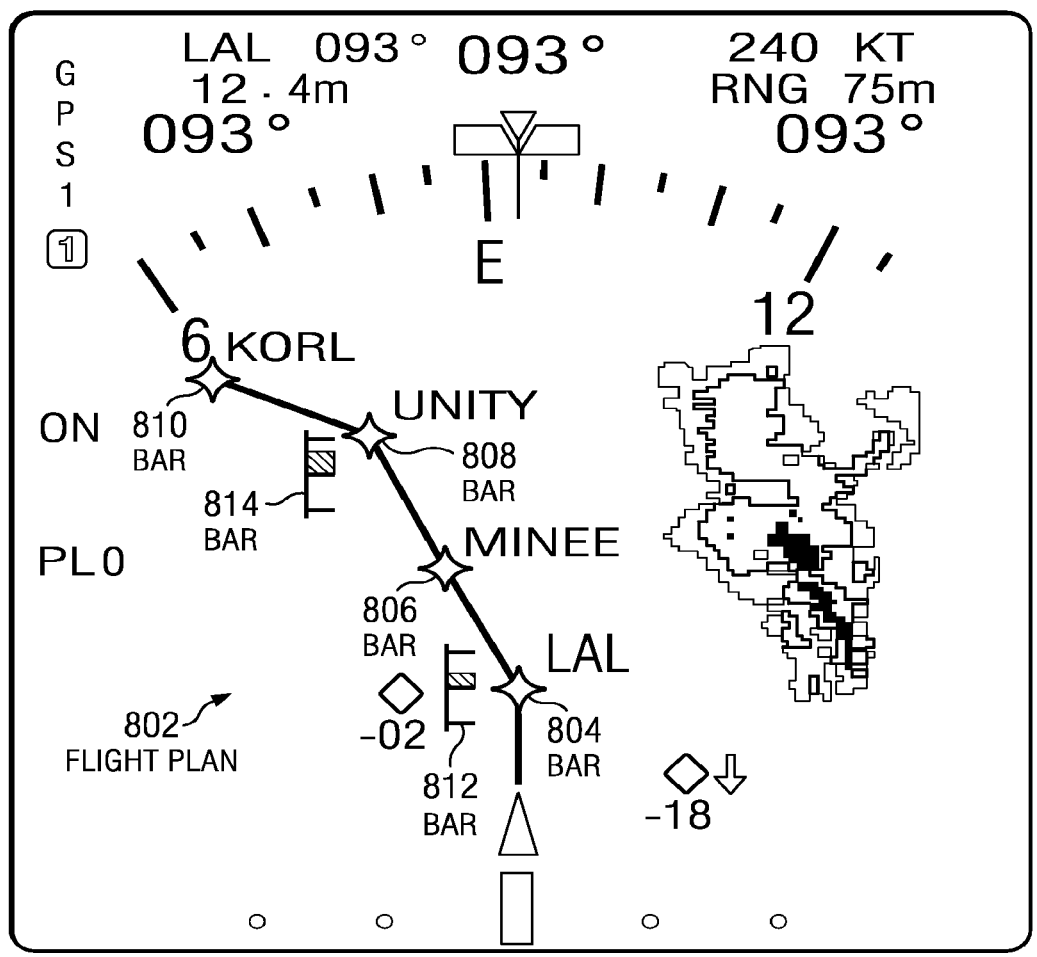
FIG. 8 is an illustration of a navigation display in accordance with an advantageous embodiment.

With reference now to FIG. 8, an illustration of a navigation display is depicted in accordance with an advantageous embodiment. Navigation display 800 may be an illustrative example of one implementation of navigation display 328 integrated with number of graphical display features 326 in FIG. 3.

Navigation display 800 includes information associated with flight plan 802. Flight plan 802 includes waypoint 804, waypoint 806, waypoint 808, and waypoint 810. Waypoint 804, waypoint 806, waypoint 808, and waypoint 810 may be illustrative examples of number of waypoints 424 in FIG. 4 and/or number of waypoints 512 in FIG. 5. Bar 812 is associated with waypoint 804. Bar 814 is associated with waypoint 808. Bar 812 and bar 814 may be illustrative examples of number of graphical display features 326 in FIG. 3 and/or number of graphical display features 600 in FIG. 6.

Bar 812 indicates that the aircraft associated with navigation display 800 is on time for the required arrival time at waypoint 804 and slightly ahead of schedule for the required arrival time at waypoint 808. Bar 812 and bar 814 may be selectable icons and/or graphical symbols that a pilot, such as pilot 312 in FIG. 3, may select to link to additional textual information about the flight status indicated by bar 812 and bar 814.

The illustration of navigation display 800 in FIG. 8 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 9:
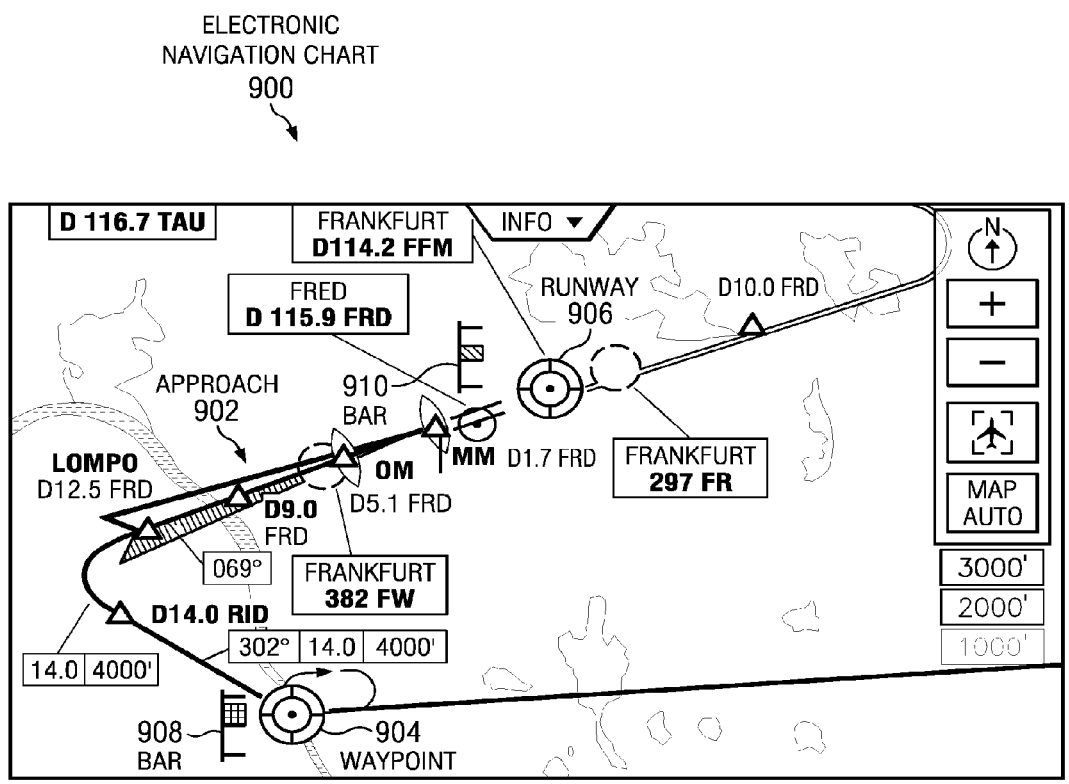
FIG. 9 is an illustration of a electronic navigation chart in accordance with an advantageous embodiment.

With reference now to FIG. 9, an illustration of a electronic navigation chart is depicted in accordance with an advantageous embodiment. Electronic navigation chart 900 is an illustrative example of one implementation of number of electronic navigation charts 330 in FIG. 3.

Electronic navigation chart 900 includes information about approach 902. Approach 902 may include waypoint 904 and runway 906. Bar 908 is associated with waypoint 904 and bar 910 is associated with runway 906. Bar 908 indicates that the aircraft associated with electronic navigation chart 900 is ahead of schedule for reaching waypoint 904 on approach 902. Bar 910 indicates that the aircraft will be on time at runway 906.

The illustration of electronic navigation chart 900 in FIG. 9 is not meant to imply physical or architectural limitations to the manner in which different advantageous embodiments may be implemented. Other components in addition and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

Figure 10:
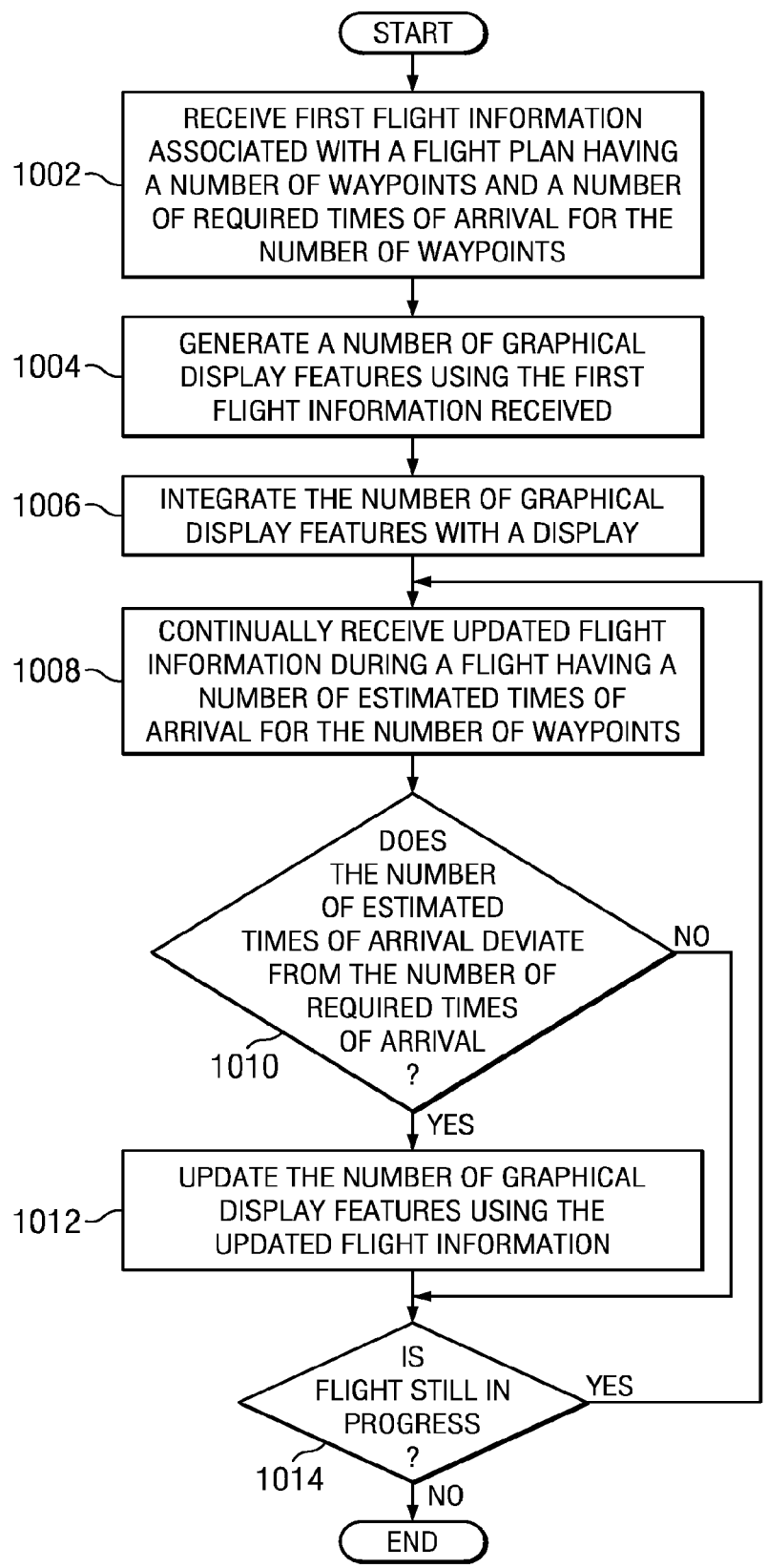
FIG. 10 is an illustration of a flowchart illustrating a process for graphical depiction of flight information in accordance with an advantageous embodiment.

With reference now to FIG. 10, an illustration of a flowchart illustrating a process for graphical depiction of flight information is depicted in accordance with an advantageous embodiment. The process in FIG. 10 may be implemented by a component such as graphical depiction process 324 in FIG. 3, for example.

The process begins by receiving first flight information associated with a flight plan having a number of waypoints and a number of required times of arrival for the number of waypoints (operation 1002). The flight plan may be received prior to flight from an aircraft operations center, for example. The flight plan may include en-route charts, terminal charts, required times of arrival, waypoints, and a destination, for example. The flight information may be received during flight by a flight management system, such as flight information 320 generated by flight management system 314 in FIG. 3.

The process generates a number of graphical display features using the first flight information received (operation 1004). The number of graphical display features may be a number of bars, such as number of bars 700 in FIG. 7, for example. The number of graphical display features indicates a current status of a flight, providing context sensitive flight information in a graphical display. The process then integrates the number of graphical display features with a display (operation 1006). The display may be, for example, without limitation, a navigational display, an electronic en-route chart, a primary flight display (PFD) with three dimensional synthetic vision display, and/or any other suitable display over a user interface, such as user interface 316 in FIG. 3.

The process continually receives updated flight information during a flight having a number of estimated times of arrival for the number of waypoints (operation 1008). The updated flight information may include, for example, without limitation, aircraft position information, time, weather information, estimated times of arrival for the number of waypoints based on the aircraft position, time, and weather information, and/or any other suitable information.

The process continually determines whether the number of estimated times of arrival deviates from the number of required times of arrival (operation 1010). If a determination is made that the updated flight information deviates from the first flight information, the process updates the number of graphical display features using the updated flight information (operation 1012), and returns to operation 1008. The process iteratively repeats operations 1008, 1010, and 1012 throughout a flight, for example. The process updates the number of graphical display features to depict the deviation determined between the estimated times of arrival and required times of arrival for the number of waypoints, for example, such as the illustrative deviations depicted in FIG. 7.

If a determination is made that the number of estimated times of arrival does not deviate from the number of required times of arrival (operation 1010), the process then determines whether the flight is still in progress (operation 1014). If a determination is made that the flight is still in progress, the process returns to operation 1008. If a determination is made that the flight is no longer in progress, the process terminates thereafter.

The process illustrated in FIG. 10 is not meant to imply any limitations to the manner in which different advantageous embodiments may be implemented. Other steps in addition and/or in place of the ones illustrated may be used. Some steps may be unnecessary in some advantageous embodiments. Also, the operations are presented to illustrate some functional steps. One or more of these operations may be combined and/or divided into different operations when implemented in different advantageous embodiments.

For example, the process may terminate if a number of waypoints for the flight plan does not have associated required times of arrival. In another illustrative example, the first flight information associated with the flight plan may include a number of waypoints having required position information associated with each waypoint, such as altitude for example. In this illustrative example, the process may continually determine if the current position information for the aircraft deviates from the required position associated with a specific waypoint.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The different advantageous embodiments recognize and take into account that current flight management systems display en-route and terminal charts associated with a flight plan using static information, or information that was predefined and preloaded well before the flight. When conditions during flight affect the travel time of the aircraft, the information depicting route information may become less relevant.

Thus, the different advantageous embodiments provide a system to graphically display flight sensitive context information in a display to provide situational awareness to a pilot and/or flight crew.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A flight management system comprising:
a user interface comprising a display; and
a computer configured to display, on the display, information about time and position of an aircraft in relation to a number of waypoints for the aircraft in a flight plan of the aircraft, wherein the information is displayed using a number of graphical display features, and wherein the number of waypoints comprise one or more reference points in physical space used for navigation.

2. The system of claim 1, wherein the information includes a number of required times of arrival and a number of estimated times of arrival for the number of waypoints.

3. The system of claim 1, wherein the number of graphical display features includes a number of bars, a number of markers, and a number of colors.

4. The system of claim 1, wherein the number of graphical display features depict a deviation from a required value.

5. The system of claim 1, wherein the number of graphical display features includes a number of additional symbols depicting a deviation outside a threshold limit.

6. The system of claim 2, wherein the information includes latitude, longitude, altitude and a current time associated with the latitude, the longitude, and the altitude.

7. The system of claim 1, wherein the number of graphical features is integrated with navigation information presented on the display, and wherein the navigation information is selected from at least one of a navigational display and an electronic navigation chart.

8. The system of claim 1, wherein the display is a three dimensional primary flight display.

* * * * *